UNITED STATES PATENT OFFICE.

WILBERT J. HUFF, OF PITTSBURGH, PENNSYLVANIA, ASSIGNOR TO THE KOPPERS COMPANY, OF PITTSBURGH, PENNSYLVANIA, A CORPORATION OF PENNSYLVANIA.

DEHYDRATION.

1,416,205.  Specification of Letters Patent.  Patented May 16, 1922.

No Drawing.  Application filed January 27, 1921. Serial No. 440,497.

*To all whom it may concern:*

Be it known that I, WILBERT J. HUFF, a citizen of the United States, residing at Pittsburgh, in the county of Allegheny and State of Pennsylvania, have invented a new and useful Improvement in Dehydration, of which the following is a full, clear, and exact description.

The present invention relates to dehydration, and more particularly to the dehydration of certain liquids which contain water as an impurity and which form with the water a constant boiling mixture which boils at a temperature lower than the boiling point of the liquid itself. Because of the formation of such constant boiling mixture, these liquids cannot be dehydrated by distillation alone. They may, however, be dehydrated by a distillation process carried out as follows:

The liquid-water mixture to be dehydrated is charged into a still and heated until the constant boiling mixture begins to distill off. The distillate is partially dehydrated, preferably by passing it over a substance which absorbs part of the water from the distillate. This process permits the use of cheap dehydrating agents which are not capable of completely dehydrating the distillate. The thus partially dehydrated distillate is returned to the still. The mixture which is distilled off is relatively rich in water. The mixture, which is returned to the still after such dehydration, is relatively poor in water. The distillation, the partial dehydration and return of the dehydrated distillate to the still is continued until the distillate becomes so poor in water that the dehydrating agent is no longer able to remove water from it. When this stage is reached, the material in the still is substantially completely dehydrated. The final dehydration then attained is a great deal higher than the dehydration which could be obtained by treating the entire body of the liquid with the dehydrating agent. This is because the concentration of the water in the distillate (which is only a small fraction of the total liquid being treated) is very much higher than the concentration of water in the charge in the still.

While my process above outlined generally, may be employed for dehydrating various liquids which form constant boiling mixtures with water, which mixtures boil at temperatures lower than the boiling points of the liquids, the process will be explained specifically as carried out in dehydrating crude water-containing pyridine, it being understood, however, that the process is not limited to this specific example.

The crude water-containing pyridine is first preferably salted out to effect a preliminary separation of the water. The salting out consists of agitating the crude pyridine with some salt which is very readily soluble in water, such as ammonium sulphate or sodium chloride. The pyridine is not very soluble in the concentrated water-salt solution. The salt solution separates by gravity from the pyridine in which it is immiscible. The supernatant pyridine is then drawn off. It still contains considerable water, often as much as fifteen to twenty (15%-20%) per cent. This water is then removed by my dehydrating process.

The water-containing pyridine is charged into a still and heated. The first portion of the distillate has the composition of the constant boiling mixture of pyridine and water, namely, three moles of water to one mole of pyridine, and having the boiling point of about 92° to 94° centigrade, at atmospheric pressure. Chemically this mixture has approximately the following composition, $C_5H_5N+3H_2O$. This distillate is much richer in water than the still charge.

The distillate is passed over a suitable dehydrating agent such as a suitable soluble salt like ammonium sulphate. A dehydrating agent can be employed which does not completely dehydrate the distillate. For example, ammonium sulphate, which is a cheap and readily available salt in by-product plants where pyridine is extracted, may be employed, although the ammonium sulphate does not completely dehydrate the distillate. The dehydration is preferably effected by passing the vapors and condensate through and over a mass of ammonium sulphate crystals. The water forms a saturated solution of ammonium sulphate giving two liquid phases; one the saturated solution of ammonium sulphate and the other the pyridine from which most of the water has been extracted. This mixture is passed into a separator where the water layer is trapped out and from which the pyridine layer is returned to the still.

The distillation and dehydration of the distillate with the ammonium sulphate is continued until the distillate no longer forms a water solution when in contact with the ammonium sulphate crystals. When this point is reached, the charge in the still is substantially completely dehydrated. When this point is reached, a little water may still remain in the distillate which has been distilled off and not yet returned to the still because the ammonium sulphate is not capable of completely dehydrating the distillate and because the pyridine-water mixture will always tend to distill off first. However, the volume of pyridine which is distilled off and being returned may be made so small compared with the total volume in the still that no important amount of water is reintroduced when the nearly dehydrated distillate is run back into the still at the end of the operation. Even the reintroduction of the water from the last distillate may be avoided by saving the distillate and using it with a fresh bath of pyridine to be dehydrated The pyridine can be rendered substantially completely anhydrous by continuing the present process and, at the final steps of distillation, retaining the distillate fraction which boils below approximately 115° C. at atmospheric pressure and using it with the next charge. This fraction is not large, provided the extraction is carried on properly. The pyridine fraction which boils above 115° C. is anhydrous.

Using ammonium sulphate and draining the dehydrated distillate back into the still and making no cut below 115° C., the pyridine can readily be dehydrated to contain less than three (3%) per cent of water, which is less than that generally demanded by the specifications for alcohol denaturing purposes.

While I prefer to use a salt as a dehydrating agent, the dehydration of the distillate may be otherwise carried out. For example, the distillate may be treated with a base such as sodium hydroxide, or the water may be removed by physical dehydrating means.

While the process is preferably carried out with continuous distillation, continuous dehydration of the distillate and continuous refluxing of the dehydrated portion of the distillate back into the still; the distillation, dehydration of the distillate and its return to the still may be intermittent. Moreover, it is not essential that the dehydrated portion of the distillate be returned to the identical still or bath from which it was distilled, as the dehydrated portion of the distillate from one still may be introduced into the undehydrated liquid in another still or it may be retained and returned to the same still with a subsequent batch of undehydrated liquid. This and similar variations in details may be made within the broader scope of my invention.

While the present invention has been specifically described with reference to dehydrating pyridine, it may be employed for dehydrating other liquids, such as certain alcohols, which form with water constant boiling mixtures having a lower boiling point than the liquid to be dehydrated. The present invention is, therefore, not limited to the specific details herein described but may be otherwise embodied within the scope of the following claims:

I claim:

1. The process of dehydrating a water-containing liquid which forms with the water a constant boiling mixture having a boiling point lower than that of the liquid, comprising distilling off a fraction from the liquid, removing water from the distillate, introducing the dehydrated portion of the distillate into the water-containing liquid and further distilling, substantially as described.

2. The process of dehydrating a water-containing liquid which forms with the water a constant boiling mixture having a boiling point lower than that of the liquid, comprising distilling off a fraction from the liquid, removing water from the distillate and returning the dehydrating portion of the distillate to the undehydrated liquid, substantially as described.

3. The process of dehydrating a water-containing liquid which forms with the water a constant boiling mixture having a boiling point lower than that of the liquid, comprising partially distilling the liquid, removing water from the distillate and re-using the dehydrated portion of the distillate with undehydrated liquid, substantially as described.

4. The process of dehydrating a water-containing liquid which forms with the water a constant boiling mixture having a boiling point lower than that of the liquid, comprising distilling off a fraction from the liquid, removing water from the distillate, and returning the dehydrated portion of the distillate to the undehydrated liquid, and continuing the operation until the desired degree of dehydration is attained, substantially as described.

5. The process of dehydrating a water-containing liquid which forms with the water a constant boiling mixture having a boiling point lower than that of the liquid, comprising continuously distilling the liquid, removing water from the distillate, and refluxing the dehydrated portion of the distillate back into the liquid being distilled, substantially as described.

6. The process of dehydrating water-containing pyridine, comprising distilling off a substantial fraction of the pyridine which serves as a vehicle to carry off water, removing water from the distillate and re-using the dehydrated pyridine distillate with water-containing pyridine for further distillation, substantially as described.

7. The process of dehydrating water-containing pyridine, comprising distilling off a fraction from the pyridine, which fraction of the pyridine serves as a vehicle to carry off water, removing water from the distillate, returning the dehydrated pyridine distillate to the pyridine being distilled, and continuing the operation until the desired degree of dehydration is attained, substantially as described.

8. The process of dehydrating water-containing pyridine, comprising continuously distilling the pyridine, the distilled pyridine serving as a vehicle to carry off water, removing water from the distillate, and refluxing the dehydrated portion of the distillate back into the pyridine being distilled, substantially as described.

In testimony whereof, I have hereunto set my hand.

WILBERT J. HUFF.

Certificate of Correction.

It is hereby certified that in Letters Patent No. 1,416,205, granted May 16, 1922, upon the application of Wilbert J. Huff, of Pittsburgh, Pennsylvania, for an improvement in "Dehydration," errors appear in the printed specification requiring correction as follows: Page 2, line 8, after the word "this" insert the word *end*, and line 59, for the word "bath" read *batch;* and that the said Letters Patent should be read with these corrections therein that the same may conform to the record of the case in the Patent Office.

Signed and sealed this 17th day of October, A. D., 1922.

[SEAL.]

KARL FENNING.
*Assistant Commissioner of Patents.*